United States Patent
Zubair et al.

(10) Patent No.: US 10,192,071 B2
(45) Date of Patent: Jan. 29, 2019

(54) METHOD FOR INTEGRATING APPLICATIONS

(71) Applicant: Blue Coat Systems, Inc., Sunnyvale, CA (US)

(72) Inventors: Noor Zubair, Karachi (PK); Muhammad Asif, Vancouver (CA); Tanveer Zamir, Allen, TX (US)

(73) Assignee: SYMANTEC CORPORATION, Mountain View, CA (US)

( * ) Notice: Subject to any disclaimer, the term of this patent is extended or adjusted under 35 U.S.C. 154(b) by 211 days.

(21) Appl. No.: 15/256,391

(22) Filed: Sep. 2, 2016

(65) Prior Publication Data

US 2018/0068132 A1 Mar. 8, 2018

(51) Int. Cl.
| | |
|---|---|
| H04L 29/06 | (2006.01) |
| G06F 21/62 | (2013.01) |
| G06F 21/31 | (2013.01) |
| G06F 21/44 | (2013.01) |

(52) U.S. Cl.
CPC .......... *G06F 21/6254* (2013.01); *G06F 21/31* (2013.01); *G06F 21/44* (2013.01); *H04L 63/0414* (2013.01); *H04L 63/0807* (2013.01); *H04L 63/102* (2013.01)

(58) Field of Classification Search
CPC ...... G06F 21/6254; G06F 21/31; G06F 21/44; H04L 63/102; H04L 63/0807; H04L 63/0414
See application file for complete search history.

(56) References Cited

U.S. PATENT DOCUMENTS

| | | | | |
|---|---|---|---|---|
| 9,876,799 | B2 * | 1/2018 | Sowatskey | G06F 21/335 |
| 9,881,301 | B2 * | 1/2018 | Rajkumar | G06Q 20/383 |
| 2005/0268087 | A1 * | 12/2005 | Yasuda | G06F 21/33 |
| | | | | 713/2 |
| 2009/0282036 | A1 * | 11/2009 | Fedtke | G06F 21/6254 |
| 2012/0036208 | A1 * | 2/2012 | Beisel | H04L 12/1895 |
| | | | | 709/206 |
| 2013/0139268 | A1 * | 5/2013 | An | G06F 21/6245 |
| | | | | 726/26 |
| 2014/0181931 | A1 * | 6/2014 | Bokarius | G06F 21/41 |
| | | | | 726/6 |
| 2014/0207813 | A1 * | 7/2014 | Long | G06F 17/30386 |
| | | | | 707/758 |
| 2015/0089568 | A1 * | 3/2015 | Sprague | H04L 63/0876 |
| | | | | 726/1 |
| 2015/0188779 | A1 * | 7/2015 | McCanne | H04L 63/10 |
| | | | | 709/203 |

(Continued)

*Primary Examiner* — Sarah Su
(74) *Attorney, Agent, or Firm* — Maschoff Brennan

(57) ABSTRACT

In certain embodiments, a method includes mapping, by a first application, personally identifiable information to an anonymous identification, generating, by the first application, a key, and sending, by a first appliance, the anonymous identification and the key to a second appliance, wherein the first appliance comprises the first application. The method also includes receiving, by the first appliance and from a browser, a token generated by a second application of the second appliance, wherein the token is associated with the key. The method further includes sending, by the first appliance, the personally identifiable information to the browser after receiving the token from the browser.

20 Claims, 5 Drawing Sheets

(56) References Cited

U.S. PATENT DOCUMENTS

| | | | |
|---|---|---|---|
| 2015/0222435 A1* | 8/2015 | Lea | H04L 63/0823 |
| | | | 713/155 |
| 2015/0310217 A1* | 10/2015 | Artes | G06F 21/577 |
| | | | 726/25 |
| 2016/0164924 A1* | 6/2016 | Rosenberg | H04L 61/1511 |
| | | | 709/227 |
| 2016/0269411 A1* | 9/2016 | Malachi | H04L 63/10 |
| 2016/0314185 A1* | 10/2016 | Buchanan | G06F 17/30598 |
| 2017/0116552 A1* | 4/2017 | Deodhar | G06Q 10/06316 |
| 2018/0096393 A1* | 4/2018 | Hartzell | H04W 4/21 |

\* cited by examiner

METHOD FOR INTEGRATING APPLICATIONS

TECHNICAL FIELD

The present disclosure relates generally to software applications, and more specifically to a method for integrating software applications.

BACKGROUND

Data protection regulations in many countries prevent enterprises from collecting, processing, or using personal data unless such action is required by a legal provision or unless consent is granted by the subject. These data protection regulations may require the enterprise to use the data only for certain predefined purposes and to implement technical safeguards such as an audit trail for all investigative activities. Accordingly, enterprises that use Software as a Service ("SaaS") applications to process data originating on-premise may have concerns about the privacy of data transferred to the SaaS appliances.

SUMMARY OF THE DISCLOSURE

In one embodiment, a method includes mapping, by an on-premise application of an enterprise, personally identifiable information to an anonymous identification, wherein the personally identifiable information and the anonymous identification are associated with a log. The method also includes sending, by an on-premise appliance, the anonymous identification and the log to an SaaS appliance, wherein the on-premise appliance includes the on-premise application and the SaaS appliance includes an SaaS application. The SaaS application generates application-specific analytics based on the log, validates an authorization of a user of the SaaS application to access the personally identifiable information, and generates, after validating the authorization of the user, a temporary token, wherein the user is associated with a browser of the enterprise.

Technical advantages of some embodiments of the disclosure may include providing an anonymized scheme to protect the privacy of data transferred to appliances external to an enterprise. Another technical advantage of certain embodiments may include providing an anonymized identification to assist an authorized user of a browser within the enterprise in accessing personally identifiable information when required for investigative purposes. Tokens may also be used to assist authorized users in accessing personally identifiable information. For example, a token may be used to inform the enterprise that the user of the browser is authorized to access the personally identifiable information.

As another technical advantage of certain embodiments of the disclosure, regenerated anonymized identifications may be provided so that a user of the enterprise cannot memorize the mapping of the personally identifiable information to the anonymous identifications. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION OF THE INVENTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts.

Figure 1A:
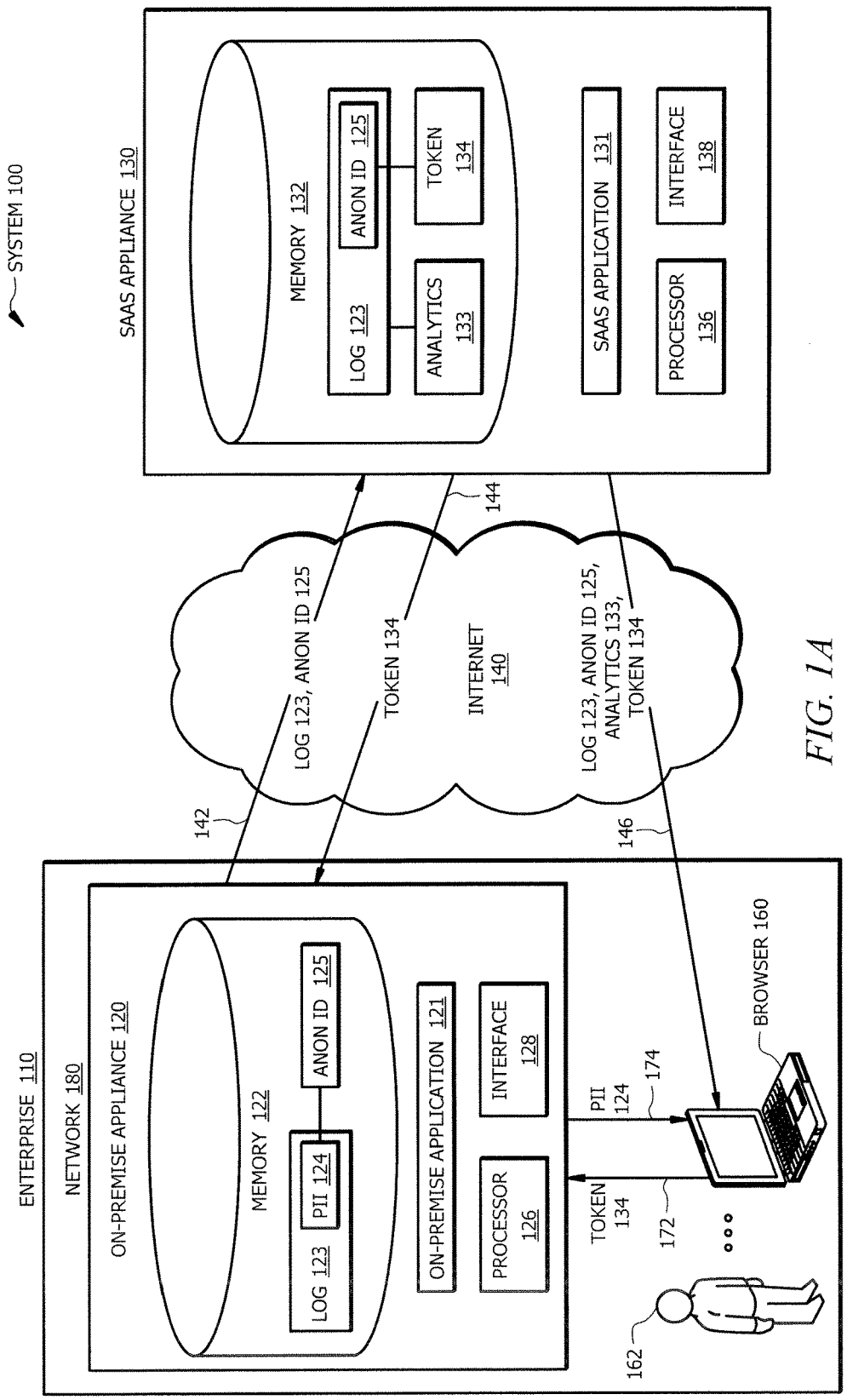
FIGS. 1A and 1B illustrate systems for integrating software applications with on-premise applications, according to certain embodiments.
Figure 1B:
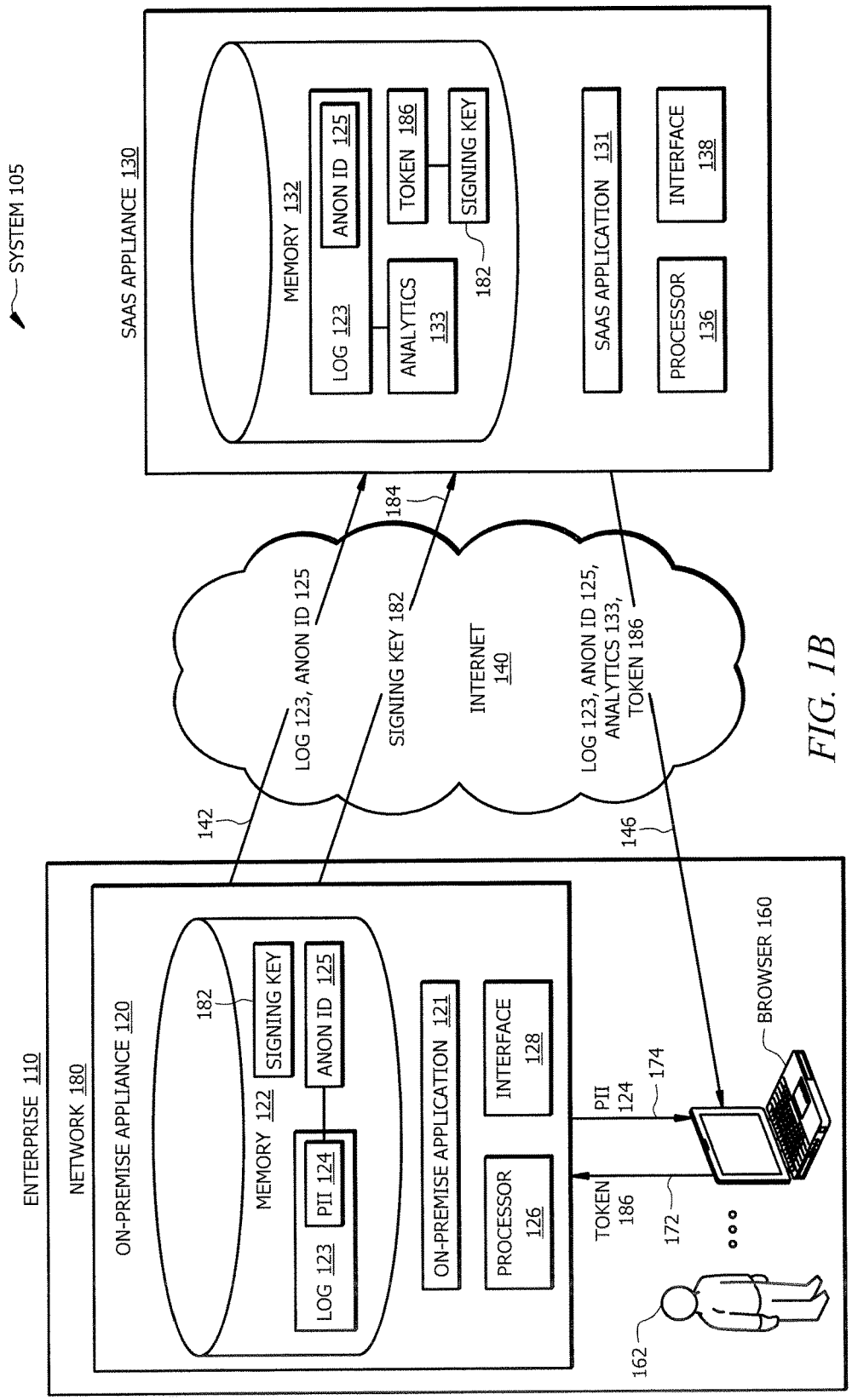

When using a Software as a Service ("SaaS") application hosted in a cloud that processes data originating outside the SaaS application (e.g., on-premise enterprise data), the originator of the data may have concerns about privacy of the data transferred to the SaaS application. For example, an SaaS application may process events or logs, wherein such logs are generated by other devices hosted on-premise (e.g., a data center owned by an enterprise.) To alleviate these concerns, SaaS application providers may offer systems for integrating an SaaS application with an on-premise application, as shown in FIGS. 1A and 1B, that anonymize personally identifiable information in the logs before transferring the logs to the cloud-hosted SaaS application. During this translation of raw logs to anonymized logs, the on-premise application may map the actual personally identifiable information and its anonymized translation such that, when required, the actual personally identifiable information can be revealed.

The on-premise appliance may then send the anonymized logs to an SaaS appliance, where the logs are processed by the SaaS application to generate application-specific analytics. An enterprise administrative assistant authorized to see these analytic results may use a browser to connect to the SaaS appliance over the Internet to view the results. However, since the personally identifiable information was anonymized before the logs were sent to the SaaS appliance, the enterprise administrative assistant is unable to view the actual personally identifiable information and instead views a pseudo random identifier, which is dependent on the scheme used for anonymization. This is acceptable for initial investigation; however, once an event of interest is identified, the administrative assistant may need to view the personally identifiable information for investigative purposes. Revealing the personally identifiable information may require mapping from the anonymous identification to the real personally identifiable information, which is only held in the on-premise appliance and traditionally requires a manual export of this mapping from the log collection appliance followed by manual transfer to the browser (e.g., workstation) that is being used to access the SaaS appliance.

To reduce or eliminate these and other problems, some embodiments of the present disclosure remove the manual transfer of mapping between the on-premise application and the browser accessing the SaaS appliance by directly opening a second connection between the browser and the on-premise appliance, wherein the browser requests the mapping information as required. This may necessitate the browser accessing the SaaS appliance and the on-premise appliance at the same time, which may only be possible when the SaaS user is on-premise or connected by a secure link (e.g., a virtual private network ("VPN")) to the enterprise's network. FIGS. 1 through 4 provide additional details relating to integrating software applications.

FIG. 1A illustrates a system 100 for integrating an on-premise application 121 with a software application 131, according to certain embodiments. In the illustrated embodiment, software application 131 is an SaaS application. System 100 includes an enterprise 110 and SaaS appliance 130. Enterprise 110 includes on-premise appliance 120 and a browser 160. On-premise appliance 120 of system 100 includes a memory 122, a processor 126, and an interface 128. SaaS appliance 130 of system 100 includes SaaS application 131, a memory 132, a processor 136, and an interface 138.

Enterprise 110 of system 100 is any organization, such as a business or company, that collects, processes, or uses personal data (e.g., personally identifiable information 124). On-premise appliance 120 is any equipment (e.g., one or more computers) located on the premises of enterprise 110 that is designed for a specific purpose. On-premise application 121 of system 100 is any software application that is installed and operated on the equipment of on-premise appliance 120. In some embodiments, on-premise appliance 120 and on-premise application 121 may be hosted in a cloud environment.

In the illustrated embodiment of FIG. 1A, memory 122 of on-premise appliance 120 includes a database that stores, either temporarily or permanently, a log 123. Memory 122 is further described in reference to FIG. 4 below. Log 123 (e.g., a device log, a proxy log, or the like) may be any regular or systematic record of an event or observation. For example, log 123 may include the content, time, or type of transactions made between enterprise 110 and a user (e.g., user 162) of enterprise 110. Log 123 may be generated by a proxy, a firewall, a personal computer, or any other device that generates electronic logs of activity. In certain embodiments, log 123 includes personally identifiable information 124. Personally identifiable information 124 is any information that can potentially identify a specific individual.

For example, personally identifiable information 124 may include a name (e.g., "Don Dabble"), an email address (e.g., "don.dabble@mycompany.co"), an Internet Protocol ("IP") address (e.g., "12.345.678.10"), an identifier used in a network (e.g., an Active Directory login user name), an account number, a machine name where the individual is logged in, or any such identifier that can be traced back to the individual.

In certain embodiments, processor 126 of enterprise 110 is included within the hardware of on-premise appliance 120 and is operable to run on-premise application 121. Processor 126 is further described in reference to FIG. 4 below. On-premise application 121 of system 100 anonymizes (e.g., hashes or tokenizes) personally identifiable information 124.

On-premise application 121 may anonymize personally identifiable information 124 to protect the privacy of the individual associated with personally identifiable information 124. In certain embodiments, on-premise application 121 may replace personally identifiable information 124 with a system-generated anonymous identification 125 (e.g., "Anon.116"). System-generated anonymous identification 125 may be used everywhere that personally identifiable information 124 appears to protect the privacy of personally identifiable information 124. In certain embodiments, on-premise application 121 maps personally identifiable information 124 to anonymous identification 125 to assist in revealing personally identifiable information 124 to authorized users of enterprise 110.

Interface 128 of on-premise appliance 120 facilitates communication between one or more components of enterprise 110 and software appliance 130. Interface 128 is further described in reference to FIG. 4 below. In the illustrated embodiment of FIG. 1A, interface 128 sends log 123 and anonymous identification 125 associated with log 123 to SaaS appliance 130 over Internet 140 (see notation 142 of FIG. 1A.) On-premise appliance 120 retains personally identifiable information 124 associated with log 123 to protect the privacy of personally identifiable information 124 outside of enterprise 110.

In the illustrated embodiment of FIG. 1A, SaaS appliance 130 receives log 123 and anonymous identification 125 associated with log 123 from SaaS appliance 130 over Internet 140 (see notation 142 of FIG. 1A.) Interface 138 of on-premise appliance 120 may facilitate communication between one or more components of enterprise 110 and SaaS appliance 130, and memory 132 of SaaS appliance 130 may include one or more databases to store log 123 and anonymous identification 125. Memory 132 and interface 138 are further described in reference to FIG. 4 below.

In certain embodiments, processor 136 of system 100 is included within the hardware of SaaS appliance 130 and is operable to run SaaS application 131. Processor 136 is further described in reference to FIG. 4 below. SaaS application 131 of SaaS appliance 130 is any software application external to enterprise 110. For example, SaaS application 131 may operate in a data center of a vendor of enterprise 110. In certain embodiments, SaaS application 131 is accessed over the Internet 140. For instance, SaaS application 131 may deliver access to end users (e.g., user 162) of enterprise 110 over Internet 140 through browser 160 of enterprise 110.

In certain embodiments, SaaS application 131 generates application-specific analytics 133 based on logs 123 received from enterprise 110. Application-specific analytics 133 may include a summary of information from one or more analyzed logs 123 received from on-premise appliance 120 of enterprise 110. Application-specific analytics 133 may be generated to comply with security policies, audits, or regulations, for troubleshooting systems, or to assist in responding to security incidents. In some embodiments, SaaS application 131 validates an authorization of a user to access SaaS application 131. For example, SaaS application 131 validates an authorization of user 162 of browser 160 to view log 123, anonymous identification 125, and application-specific analytics 133 generated by SaaS application 131. Memory 132 of on-premise appliance 120 may store application-specific analytics 133 in one or more databases.

In some embodiments, SaaS application 131 validates an authorization of a user to access sensitive information external to SaaS appliance 130. For example, SaaS application 131 may validate an authorization of a user of SaaS application 131 to access personally identifiable information 124 stored within enterprise 110 even though SaaS application 131 does not have access to personally identifiable information 124. In the illustrated embodiment of FIG. 1A, SaaS application 131 validates the authorization of user 162 of browser 160 of enterprise 110 to access personally identifiable information 124 stored at enterprise 110 but not revealed to user 162 of browser 160. In certain embodiments, SaaS application 131 validates that user 162 of SaaS application 131 is authorized to reveal sensitive information based on the role-based access control ("RBAC") profile of user 162. For example, one or more components of on-premise appliance 120 may assign a profile to user 162 within enterprise 110, wherein the profile of user 162 indicates whether user 162 of browser 160 is authorized to access personally identifiable information 124. On-premise appliance 120 may then share the profile of user 162 with SaaS application 131, and SaaS application 131 can validate the authorization of user 162 based on this shared profile.

After validating the authorization of user 162, SaaS application 131 may generate a token 134. In certain embodiments, token 134 is used to grant a user access to certain personally identifiable information 124 and is not directly tied to anonymous identification 125. Alternatively, in some embodiments, token 134 may be associated with anonymous identification 125. In certain embodiments, token 134 is a temporary password that may expire after a certain amount of time (e.g., 30 seconds, 30 minutes, or 2 hours) or after a certain action is performed (e.g., token 134 is received by browser 160 of enterprise 110). User 162 of SaaS application 131 may request token 134 if user 162 desires to reveal the true identity of anonymous identification 125. For example, in the event that user 162 of SaaS application 131 identifies an event of interest in application-specific analytics 133, user 162 may request token 134 to assist the user in obtaining personally identifiable information 124 associated with anonymous identification 125.

In certain embodiments, SaaS application 131 maps each token 134 to its associated log 123, anonymous identification 125, and application-specific analytics 133. SaaS application 131 may then send this mapping of token 134 to log 123 to enterprise 110 over Internet 140 (see notation 144 of FIG. 1A) to assist enterprise 110 in revealing personally identifiable information 124 to authorized users (e.g., user 162) of enterprise 110. In some embodiments, token 134 is embedded within anonymous identification 125.

In the illustrated embodiment of FIG. 1A, SaaS application 131 sends token 134 to browser 160 of enterprise 110 over Internet 140 (see notation 146 of FIG. 1A.) Browser 160 of enterprise 110 may be any computer that provides a means to view and interact with information on Internet 140. In certain embodiments, browser 160 includes a graphical user interface ("GUI") that can display information. Browser 160 may be located on the physical premises of enterprise 110 (e.g., a building of enterprise 110). In some embodiments, browser 160 is located outside of the physical premises of enterprise 110 (e.g., at a residence of user 162), wherein user 162 of browser 160 connects to a network 140 of enterprise 110 via a VPN. User 162 (e.g., an administrative assistant of enterprise 110) may use browser 160 to connect to SaaS application 131 over Internet 140. In the illustrated embodiment of FIG. 1A, user 162 of browser 160 requires authorization from SaaS application 131 to view log 123, anonymous identification 125, and application-specific analytics 133 from SaaS application 131.

In certain embodiments, user 162 of browser 160 may identify an event of interest in application-specific analytics 133 generated by SaaS application 131. The event of interest may require user 162 of browser 160 to access personally identifiable information 124 from on-premise appliance 120 of enterprise 110. Browser 160 may receive token 134 generated by SaaS application 131 (see notation 146 of FIG. 1A) and send token 134 to on-premise appliance 120 (see notation 172 of FIG. 1A) to request personally identifiable information 124. In certain embodiments, SaaS application 131 only allows browser 160 to access token 134 once SaaS application 131 has validated the authorization of user 162 of browser 160 to view personally identifiable information 124. Since on-premise appliance 120 can verify that temporary token 134 is generated by SaaS application 131, and because on-premise appliance 120 trusts SaaS application 131 to validate the authorization of the user of browser 160 before sending token 134 to the user, on-premise appliance 120 may send personally identifiable information 124 to browser 160 (see notation 174 of FIG. 1A.)

In certain embodiments, browser 160 receives log 123 and anonymous identification 125 from SaaS appliance 130. For example, browser 160 may receive the same log 123 and anonymous identification 125 from SaaS appliance 130 that SaaS appliance 130 received from on-premise appliance 120. As another example, SaaS application 131 may replace anonymous identification 125 with an SaaS identifier such that browser 160 receives the SaaS identifier rather than anonymous identification 125.

In some embodiments, browser 160 accesses SaaS application 131 and one or more components of on-premise appliance 120 at the same time. In certain embodiments, browser 160 displays personally identifiable information 124 along with log 123 and application-specific analytics 133. In some instances, browser 160 may simultaneously display personally identification 124 received from on-premise appliance 120 and application-specific analytics 133 generated by SaaS application 131 via a GUI of browser 160.

System 100 of FIG. 1A may re-anonymize personally identifiable information 124 once personally identifiable information 124 is revealed to a user (e.g., user 162) of SaaS application 131. For example, after on-premise appliance 120 sends personally identifiable information 124 associated with anonymous identification 125 to browser 160, on-premise application 121 may map personally identifiable information 124 to a new anonymous identification (e.g., "Anon.117"), wherein the new anonymous identification is different than anonymous identification 125 (e.g., "Anon.116").

In certain embodiments, SaaS appliance 130 may re-anonymize anonymous identification 125. For example, on-premise application 121 may replace personally identifiable information 124 with anonymous identification 125 (e.g., "Anon.116") and send anonymous identification 125 to SaaS appliance 130, wherein SaaS appliance 130 uses anonymous identification 125 for intermediate processing and storage. SaaS application 131 may then generate another level of mapping for every anonymous identification 125 received from on-premise appliance 120. For instance, SaaS application 131 may assign a first SaaS identifier (e.g., "SaaS.333") to anonymous identification 125 (e.g., "Anon.116") and share this mapping with on-premise appliance 120. SaaS appliance 130 may then use this first SaaS identifier when sending processed results to browser 160 of enterprise 110. Browser 160 may then send a request to on-premise appliance 120 with the first SaaS identifier, and since on-premise appliance 120 recognizes the mapping of the first SaaS identifier to anonymous identification 125, on-premise appliance 120 may return personally identifiable information 124 associated with anonymous identification 125 to browser 160.

In certain embodiments, when reanonymization is required, SaaS application updates its mapping of anonymous identification 125 to a second SaaS identifier (e.g., "SaaS.444") and shares this updated mapping with on-premise appliance 120. The regeneration of anonymous identification 125 may reduce or eliminate problems associated with user 162 (e.g., an administrative assistant of enterprise 110) of browser 160 from memorizing the mapping between personally identifiable information 124 and anonymous identification 125.

Network 180 of enterprise 110 is any network that facilitates communication within enterprise 110. For example, network 180 may facilitate the transfer of information between on-premise appliance 120 and browser 160. In certain embodiments, network 180 isolates users and workgroups external to enterprise 110. As an example, network 180 may only be accessible to users and workgroups on the premises of enterprise 110. As another example, network 180 may be accessible to users via a VPN. The VPN may allow a user (e.g., an administrative assistant user of enterprise 110) to use an off-premise browser to send and receive data as if the user's browser were directly connected to network 180 while maintaining the security of private network 180.

In operation of certain embodiments, SaaS application 131 of enterprise 110 validates the authorization of SaaS user 162 requesting access to personally identifiable information 124 by using an RBAC profile of SaaS user 162 (e.g., an enterprise administrative assistant) and a temporary token 134 generated by SaaS application 131. Temporary token 134 is generated on SaaS application 131 using a trust mechanism (e.g., a shared secret or a certificate) between on-premise appliance 120 and SaaS appliance 130. Temporary token 134 is then transferred from SaaS appliance 130 to the SaaS user's browser 160 if user 162 is authorized to access personally identifiable information 124. User 162 of browser 160 then uses temporary token 134 to make a representational state transfer ("REST") call to on-premise appliance 120 of enterprise 110 to translate anonymized information 125 to personally identifiable information 124. Since on-premise appliance 120 can verify that token 134 is generated by SaaS application 131 and it trusts SaaS application 131 to validate the authorization of user 162 before generating token 134, on-premise appliance 120 returns personally identifiable information 124 to browser 160 in the REST call, which is then displayed on browser 160, along with application-specific analytics 133 that are returned from SaaS application 131. To user 162 of enterprise 110, this gives the same experience as if personally identifiable information 124 was actually stored in SaaS appliance 130 along with application-specific analytics 133, even though browser 160 retrieved application-specific analytics 133 from cloud-hosted SaaS application 131 and personally identifiable information 124 from on-premise appliance 120.

FIG. 1B illustrates a system 105 for integrating an on-premise application 121 with a software application 131, according to certain embodiments. System 105 shares certain components with system 100. For example, system 105 includes enterprise 110 and SaaS appliance 130, wherein enterprise 110 includes on-premise appliance 120 and browser 160. As another example, on-premise appliance 120 of system 105 includes memory 122, processor 126, and interface 128, and SaaS appliance 130 of system 105 includes SaaS application 131, memory 132, processor 136, and interface 138.

In the illustrated embodiment of FIG. 1B, memory 122 of on-premise appliance 120 includes log 123. In certain embodiments, log 123 of system 105 includes personally identifiable information 124. As discussed above in reference to FIG. 1A, on-premise application 121 may replace personally identifiable information 124 with system-generated anonymous identification 125, and interface 128 may send log 123 and personally identification 125 associated with log 123 to SaaS appliance 130 over Internet 140 (see notation 142 of FIG. 1B.)

In certain embodiments, processor 126 of on-premise appliance 120 generates a key 182. Key 182 may be a signing key. In some embodiments, key 182 is a shared public/private key pair between on-premise appliance 120 and SaaS appliance 130. In certain embodiments, key 182 may be generated by the practical public-key cryptosystem RSA algorithm. In the illustrated FIGURE of 1B, interface 128 of on-premise appliance 120 sends key 182 to SaaS appliance 130 over Internet 140 (see notation 184 of FIG. 1B.) While key 182 of FIG. 1B is shown as a signing key, key 182 represents any shared secret between on-premise appliance 120 and SaaS appliance 130. As shown in the illustrated embodiment of FIG. 2B, SaaS appliance 130 receives key 182 and stores key 182 in memory 132. In certain embodiments, SaaS appliance generates temporary token 186, wherein temporary token 186 is associated with signing key 182. For example, temporary token 186 may comprise signing key 182 such that generated temporary token 186 is a signed key. Interface 138 of SaaS appliance 130 then sends temporary token 186 (e.g., a signed key) to browser 160 (see notation 146 of FIG. 1B), wherein browser 160 sends token 186 to on-premise appliance 120. Since on-premise appliance 120 can verify that temporary token 186 is derived from signing key 182, which was originally sent by on-premise appliance 120 to SaaS appliance 130, on-premise appliance 120 can validate that token 186 was transformed by SaaS appliance 130 after authorization and that token 186 has not been tampered with to elevate authorization beyond what was validated by SaaS appliance 130. On-premise appliance 120 may then send personally identifiable information 124 to browser 160 (see notation 174 of FIG. 1A.)

In certain embodiments, on-premise appliance 120 may generate multiple keys 182. For example, on-premise appliance 120 may generate a new key 182 in pre-determined time intervals (e.g., every five seconds) and send each generated key 182 to SaaS appliance 130. In certain embodiments, generated token 186 may include embedded information that identifies one or more users authorized to view personally identifiable information 124. For example, the embedded information of generated token 186 may include an authorization of a single user 162 of browser 160 to view personally identifiable information 124. As another example, the embedded information of generated token 186 may include an authorization of a single user 162 to view multiple or all personally identifiable information (e.g., personally identifiable information 124a-n). For instance, user 162 may be authorized to view a table of personally identifiable information 124a-n associated with persons that performed an activity investigated by user 162. As still another example, the embedded information of generated token 186 may authorize multiple users 162 of multiple browsers 160 to view personally identifiable information 124.

In some embodiments, signing key 182 is not associated with any particular log 123, which may increase the efficiency of system 105 by reducing processing time and lessening memory storage requirements of on-premise appliance 120. Similarly, in certain embodiments, token 186 of SaaS appliance 130 may not be associated with any particular log 123. Rather, token 186 may be associated with one or more users 162 that are authorized to access personally identifiable information 124. However, one skilled in the art would recognize, in certain situations, the benefit of associating signing key 182 and/or token 186 with log 123 and/or anonymous identification 125.

In certain embodiments, other authentication/authorization schemes are utilized. For example, browser 160 of enterprise 110 may authenticate itself to on-premise appliance 120 via a login or password, wherein on-premise appliance 120 uses a protocol such as Security Assertion Markup Language ("SAML") to authorize user 162 with SaaS appliance 130.

Certain embodiments of FIGS. 1A and 1B may include two SaaS appliances 130a and 130b. For example, on-premise appliance 120 may trust SaaS appliance 130a with personally identifiable information 124 such that SaaS appliance 130a generates logs 123 with personally identifiable information 124 rather than on-premise appliance 120. However, due to security concerns with SaaS appliance 130b, logs 123 may be anonymized prior to sending logs 123 to SaaS appliance 130b. As an example, on-premise appliance 220 may pull logs 123 and personally identifiable information 124 from SaaS appliance 130a and anonymize logs 123 prior to sending logs 123 to SaaS appliance 130b. As another example, SaaS appliance 130a may anonymize logs 123 and send anonymized logs 123 directly to SaaS appliance 130b.

As still another example, SaaS appliance 130a may anonymize logs 123, and on-premise appliance 120 may pull anonymized logs 123 from SaaS appliance 130a and send the received anonymized logs 123 to SaaS appliance 130b.

Although this disclosure describes and illustrates systems 100 and 105 having particular components, the components of systems 100 and 105 may be different from those illustrated in FIGS. 1A and 1B, according to particular applications. For example, on-premise appliance 120 may include multiple memories 122a-n, multiple processors 126a-n, and multiple interfaces 128a-n. As another example, memory 122 of on-premise appliance 120 may store multiple logs 123a-n, multiple personally identifiable information 124a-n, and multiple anonymous identifications 125a-n. As still another example, memory 122 of on-premise appliance 120 may not store log 123.

Figure 2A:
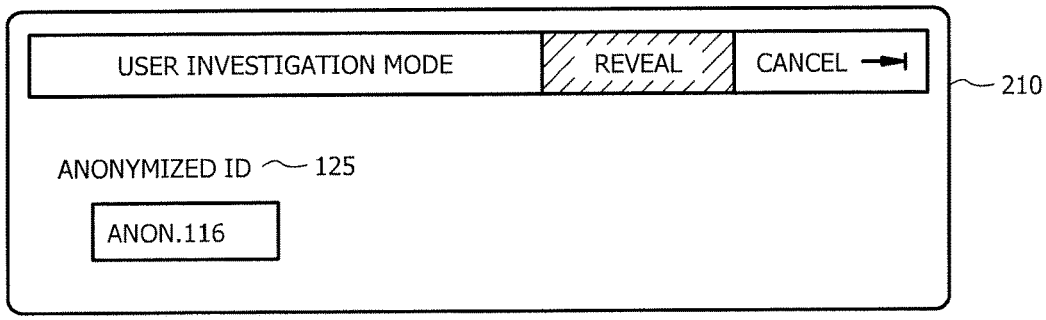
FIG. 2A illustrates a data entry box that may be used by the systems of FIGS. 1A and 1B, according to certain embodiments.

FIG. 2A illustrates a data entry box 210 that may be used by system 100 of FIG. 1A and system 105 of FIG. 1B, according to certain embodiments. A shown in FIG. 2A, user 162 may enter information into data entry box 210 to request personally identifiable information 124 from on-premise appliance 120. For example, user 162 of browser 160 may enter anonymous identification 125 (e.g., "Anon.116") in the box labeled "Anonymized ID." User 162 of browser 160 may then select the "Reveal" button located near the top right corner of data entry box 210 of FIG. 2A, which submits a request for personally identifiable information 124 to on-premise appliance 120 (see notation 172 of FIGS. 1A and 1B.)

Figure 2B:
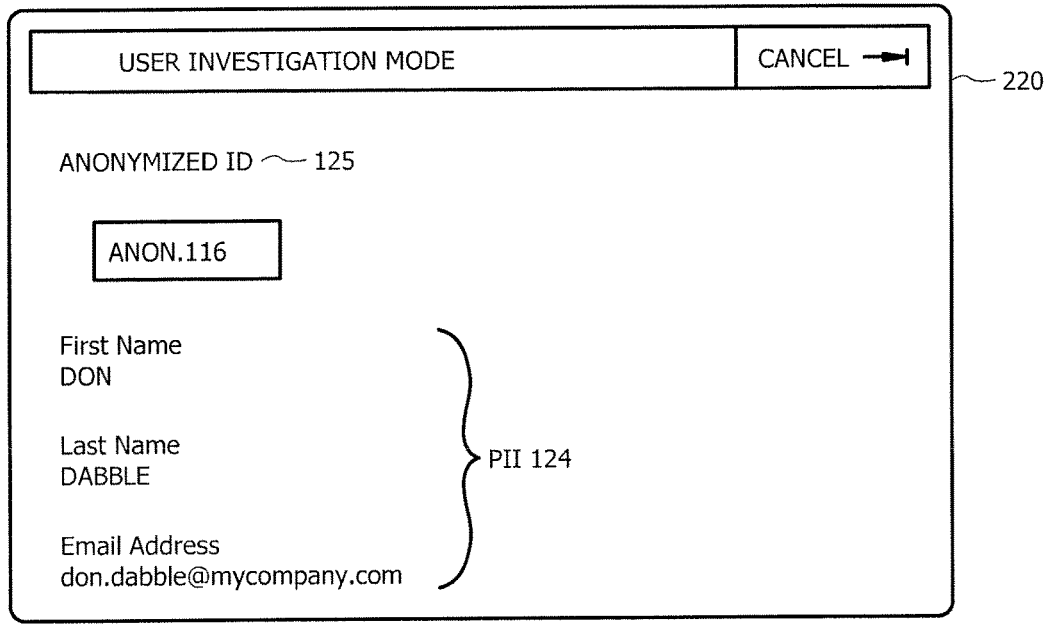
FIG. 2B illustrates a screenshot displaying personally identifiable information that may be used by the systems of FIGS. 1A and 1B, according to certain embodiments.

FIG. 2B illustrates a screenshot 220 displaying personally identifiable information 124 that may be used by system 100 of FIG. 1A and system 105 of FIG. 1B, according to certain embodiments. As shown in screenshot 220 of FIG. 2B, user 162 of browser 162 may access personally identifiable information 124 associated with anonymous identification 125 on a display of browser 160. For example, after selecting the "Reveal" button in data entry box 210 of FIG. 2A, on-premise appliance 120 may grant user 162 access to personally identifiable information 124 (see notation 174 of FIGS. 1A and 1B.) User 162 views the following personally identifiable information 124 associated with anonymous identification 125: First name Don, Last Name Dabble, and Email Address don.dabble@mycompany.co. In certain embodiments, browser 160 simultaneously displays personally identifiable information 124 received from on-premise appliance 120 and application-specific analytics 133 received from SaaS appliance 130.

Figure 2C:
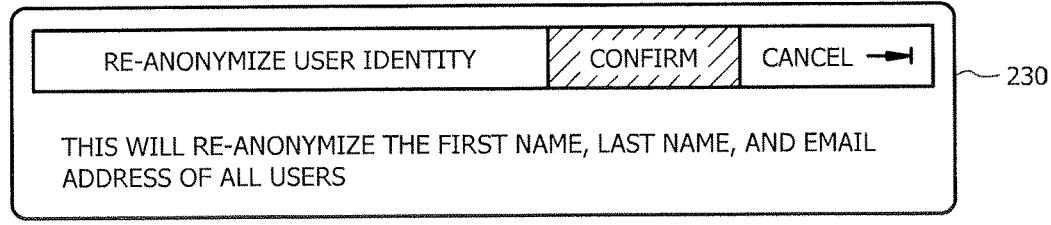
FIG. 2C illustrates a re-anonymizing dialog box used by the systems of FIGS. 1A and 1B, according to certain embodiments.

FIG. 2C illustrates a re-anonymizing dialog box 230 that may be used by system 100 of FIG. 1A and system 105 of FIG. 1B, according to certain embodiments. As shown in FIG. 2C, user 162 of browser 160 may select the "Confirm" button near the top right corner to re-anonymize previously revealed anonymous identification 125. In certain embodiments, SaaS appliance 130 may regenerate or remap anonymous identifications 125 automatically. For example, SaaS application 131 may re-anonymize anonymous identifications 125 in accordance with a pre-determined time interval. As another example, SaaS application 131 may re-anonymize anonymous identifications 125 each time SaaS appliance 130 reveals anonymous identification 125 to browser 160.

Figure 3:
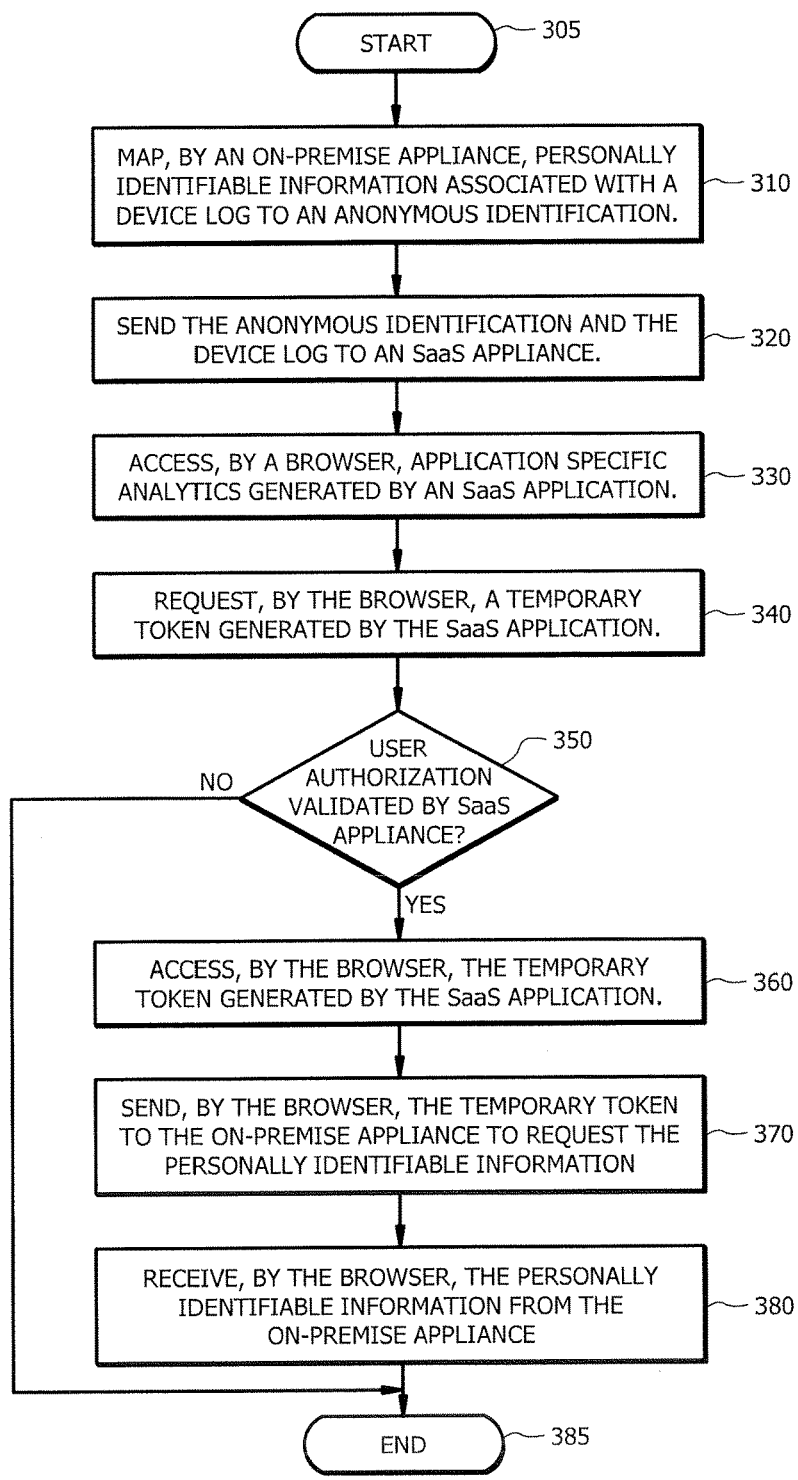
FIG. 3 illustrates a method for integrating a software application with an on-premise application, according to certain embodiments.

FIG. 3 illustrates a method for integrating a software application (e.g., SaaS application 131) with an on-premise application (e.g., on-premise application 121), according to certain embodiments. Method 300 of FIG. 3 begins at step 305. At step 310, an on-premise application (e.g., on-premise application 121) of an enterprise (e.g., enterprise 110) maps personally identifiable information (e.g., personally identifiable information 124) to an anonymous identification (e.g., anonymous identification 125), wherein the personally identifiable information and the anonymous identification are associated with a log (e.g., log 123). The log may include the personally identifiable information. In certain embodiments, on-premise application 121 may anonymize the personally identifiable information associated with the log. For example, the personally identifiable information may include first name "Don," last name "Dabble," and email address "don.dabble@mycompany.co," and the on-premise application may anonymize this information to be represented by anonymous identification "Anon.116." On-premise application 121 may utilize any anonymization scheme suitable to protect against the unauthorized use of the personally identifiable information.

Method 300 of FIG. 3 may then proceed to step 320, where an on-premise appliance (e.g., on-premise appliance 120) sends the anonymous identification (e.g., "Anon.116") and its associated log to an SaaS appliance (e.g., SaaS appliance 130.) In certain embodiments, the SaaS application of the SaaS appliance generates application-specific analytics (e.g., application-specific analytics 133) based on the log. The SaaS application may validate an authorization of a user (e.g., user 162) of the SaaS application to access the personally identifiable information, wherein the user is associated with a browser (e.g., browser 160) of the enterprise. In some embodiments, the SaaS application generates, after validating the authorization of the user, a temporary token (e.g., token 134 or token 186).

At step 330 of the illustrated embodiment of FIG. 3, the browser of the enterprise accesses the generated application-specific analytics from the SaaS appliance. Method 300 may then proceed to step 340, where the browser requests, from the SaaS appliance, the temporary token. Method 300 may then proceed to decision 350, where it may be determined whether a user authorization has been validated by the SaaS application. If the SaaS application has validated an authorization of the user of the SaaS appliance to access the personally identifiable information, method 300 of FIG. 3 proceeds to step 360.

At step 360 of the illustrated embodiment of FIG. 3, the browser accesses, from the SaaS appliance, the generated temporary token. Method 300 may then proceed to step 370, where the browser of the enterprise sends, through a network (e.g., network 180) of the enterprise, the temporary token to the on-premise appliance to request the personally identifiable information. For example, as shown in FIG. 2A, the user of the browser may enter anonymous identification 125 into data entry box 210 and select the "Reveal" button to submit a request for the personally identifiable information to the on-premise appliance.

In certain embodiments, upon the on-premise appliance receiving the token from the browser, the on-premise application translates the anonymous identification associated with the received token into the personally identifiable information and sends the personally identifiable information to the browser through the network of the enterprise. At step 380 of the illustrated embodiment of FIG. 3, the browser receives the personally identifiable information from the on-premise appliance. For example, as shown in FIG. 2B, the user of the browser may view personally identifiable information 124 associated with anonymous identification 125 on a display of the browser. In certain embodiments, the browser simultaneously displays the personally identifiable information received from the on-premise appliance and the application-specific analytics received from the SaaS appliance. This simultaneous display of information may provide a user of the browser the same experience as if the personally identifiable information was stored in the SaaS appliance. Method 300 ends at step 385.

Method 300 may include more or less steps than those illustrated in FIG. 3. For example, method 300 may include re-anonymizing the anonymous identifications after the personally identifiable information is revealed to the browser, which may reduce or eliminate problems associated with a user of the browser memorizing the previous mapping of the personally identifiable information to the anonymous identification. As shown in FIG. 2C, the user of the browser may select the "Confirm" button to re-anonymize the previously revealed anonymous identification.

As another example, method 300 may include mapping, by the SaaS application, the anonymous identification (e.g., "Anon.116") to a first SaaS identifier (e.g., "SaaS.333") and sharing, by the SaaS appliance, this first SaaS identifier with the on-premise appliance. Method 300 may further include sending, by the SaaS appliance, this first SaaS identifier to the browser of the enterprise, remapping, by the SaaS application and after sending the first identifier to the browser of the enterprise, the anonymous identification to a second SaaS identifier (e.g., "SaaS.444"), and sharing, by the SaaS appliance, this second SaaS identifier with the on-premise appliance.

Figure 4:
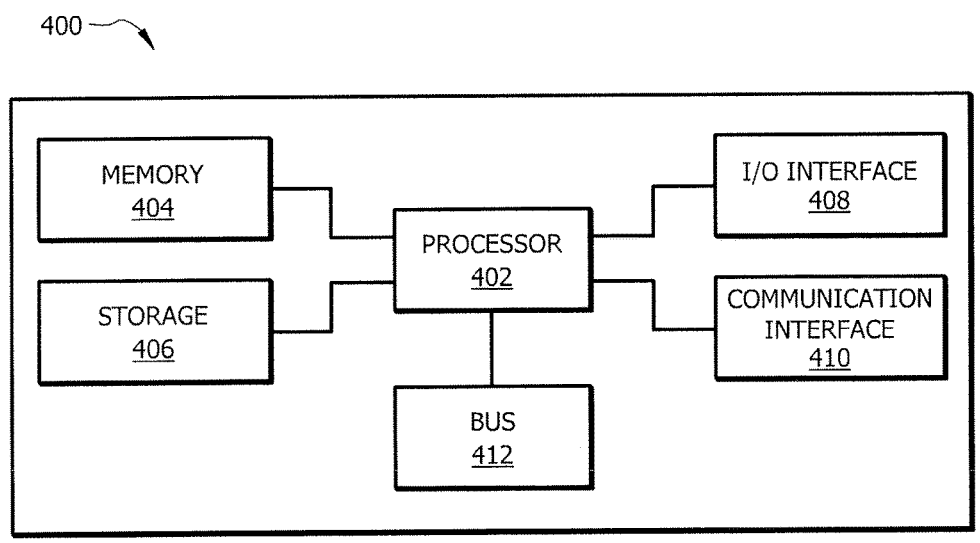
FIG. 4 illustrates a computer system that may be used by or as the computer systems of FIGS. 1 through 3, according to certain embodiments.

FIG. 4 illustrates a computer system that may be used by or as the computer systems of FIGS. 1 through 3, according to certain embodiments. One or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein, including and without limitation, steps performed by the on-premise application, the SaaS application, and the browser of the steps of FIG. 3. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402 (e.g., processor 126 or processor 136) memory 404 (e.g., memory 122 or memory 132), storage 406, an input/output (I/O) interface 408, a communication interface 410 (e.g., interface 128 or interface 138), and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 (e.g., interface 256 or interface 356) includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 (e.g., interface 256 or interface 356) includes hardware, software, or both providing one or more interfaces for communication (such as, for example, packet-based communication) between computer system 400 and one or more other computer systems 400 or one or more networks (e.g., network 180). As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

The components of computer system 400 may be integrated or separated. In some embodiments, components of computer system 400 may each be housed within a single chassis. The operations of computer system 400 may be performed by more, fewer, or other components. Additionally, operations of computer system 400 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for integrating a Software as a Service ("SaaS") application with an on-premise application, comprising:
    mapping, by the on-premise application of an enterprise, personally identifiable information to an anonymous identification, wherein the personally identifiable information and the anonymous identification are associated with a log;
    sending, by an on-premise appliance, the anonymous identification and the log to an SaaS appliance, the on-premise appliance comprising the on-premise application and the SaaS appliance comprising the SaaS application, wherein the SaaS application is configured to:
        generate application-specific analytics based on the log;
        validate an authorization of a user of the SaaS appliance to access the personally identifiable information, wherein the user is associated with a browser of the enterprise; and
        generate, after validating the authorization of the user, a temporary token;
    accessing, by the browser of the enterprise, the generated application-specific analytics from the SaaS appliance;
    requesting, by the browser of the enterprise and from the SaaS appliance, the temporary token;
    accessing, by the browser of the enterprise and from the SaaS appliance, the generated temporary token;
    sending, by the browser of the enterprise and through a network of the enterprise, the temporary token to the on-premise appliance to request the personally identifiable information mapped to the anonymous identification; and
    receiving, by the browser of the enterprise, the personally identifiable information from the on-premise appliance.

2. The method of claim 1, wherein the personally identifiable information comprises a name, an email address, or an Internet Protocol ("IP") address.

3. The method of claim 1, wherein validating the authorization of the user of the enterprise is based on a role-based access control ("RBAC") profile of the user.

4. The method of claim 1, further comprising:
    generating, by the on-premise appliance, a key; and
    sending, by the on-premise appliance, the key to the SaaS appliance, wherein generating the temporary token comprises signing the key such that the generated temporary token is a signed key.

5. The method of claim 1, wherein the browser of the enterprise is configured to access the SaaS appliance and the on-premise appliance at the same time.

6. The method of claim 1, further comprising:
    mapping, by the SaaS application, the anonymous identification to a first SaaS identifier;
    sharing, by the SaaS appliance, the first SaaS identifier with the on-premise appliance;
    sending, by the SaaS appliance, the first SaaS identifier to the browser of the enterprise;
    remapping, by the SaaS application and after sending the first identifier to the browser of the enterprise, the anonymous identification to a second SaaS identifier; and
    sharing, by the SaaS appliance, the second SaaS identifier with the on-premise appliance.

7. The method of claim 1, further comprising simultaneously displaying, by the browser of the enterprise, the personally identifiable information received from the on-premise appliance and the application-specific analytics accessed from the SaaS appliance.

8. The method of claim 1, wherein the browser sends the temporary token to the on-premise appliance and receives the personally identifiable information from the on-premise appliance through a virtual private network ("VPN") connection.

9. The method of claim 1, wherein the browser is located in a building of the enterprise.

10. The method of claim 1, wherein the log is a device log or a proxy log.

11. A system, comprising:
an on-premise application of an enterprise configured to map, by a processor, personally identifiable information to an anonymous identification, wherein the personally identifiable information and the anonymous identification are associated with a log; and
an on-premise appliance of the enterprise configured to send, by an interface, the anonymous identification and the log to a Software as a Service ("SaaS") appliance, the SaaS appliance comprising an SaaS application, wherein the SaaS application is configured to:
generate application-specific analytics based on the log;
validate an authorization of a user of the enterprise to access the personally identifiable information, wherein the user is associated with a browser of the enterprise; and
generate, after validating the authorization of the user, a temporary token; and a browser of the enterprise configured to:
access the generated application-specific analytics from the SaaS application;
request, from the SaaS appliance, the temporary token;
access, from the SaaS appliance, the generated temporary token;
send, through a network of the enterprise, the temporary token to the on-premise appliance to request the user identifiable information mapped to the anonymous identification; and
receive the personally identifiable information from the on-premise appliance.

12. The system of claim 11, wherein the personally identifiable information comprises a name, an email address, or an Internet Protocol ("IP") address.

13. The system of claim 11, wherein validating the authorization of the user of the enterprise is based on a role-based access control ("RBAC") profile of the user.

14. The system of claim 11, wherein:
the on-premise appliance is further configured to generate a key and send the key to the SaaS appliance; and
generating the temporary token comprises signing the key such that the generated temporary token is a signed key.

15. The system of claim 11, wherein the browser of the enterprise is further configured to access the SaaS appliance and the on-premise appliance at the same time.

16. The system of claim 11, wherein:
the SaaS application is further configured to map the anonymous identification to a first SaaS identifier;
the SaaS appliance is configured to share the first SaaS identifier with the on-premise appliance and send the first SaaS identifier to the browser of the enterprise;
the SaaS application is further configured to remap, after the first identifier is sent to the browser of the enterprise, the anonymous identification to a second SaaS identifier; and
the SaaS appliance is further configured to share the second SaaS identifier with the on-premise appliance.

17. The system of claim 11, wherein the browser of the enterprise is further configured to simultaneously display the personally identifiable information received from the on-premise appliance and the application-specific analytics accessed from the SaaS appliance.

18. The system of claim 11, wherein the browser of the enterprise is configured to send the temporary token to the on-premise appliance and receive the personally identifiable information from the on-premise appliance through a virtual private network ("VPN") connection.

19. The system of claim 11, wherein the browser is located in a building of the enterprise.

20. A method, comprising:
mapping, by a first application, personally identifiable information to an anonymous identification;
generating, by the first application, a key;
sending, by a first appliance, the anonymous identification and the key to a second appliance, wherein the first appliance comprises the first application;
receiving, by the first appliance and from a browser, a token generated by a second application of the second appliance, wherein the token is associated with the key; and
sending, by the first appliance and in response to receiving the token from the browser, the personally identifiable information to the browser.

* * * * *